Feb. 3, 1948.  A. R. WURTELE  2,435,334
CONVEYING MECHANISM FOR HARVESTERS
Filed Sept. 7, 1944  2 Sheets-Sheet 2
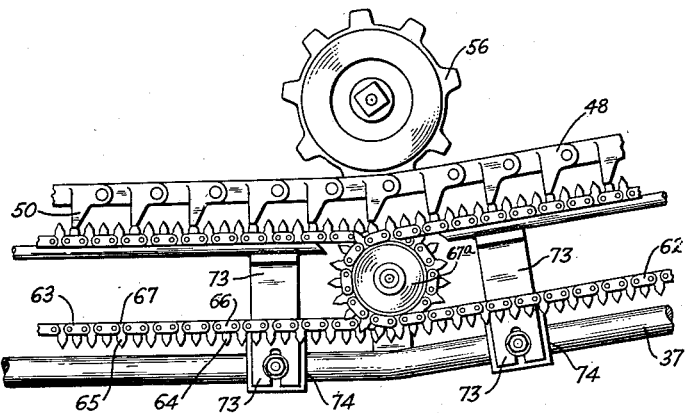
Fig. 3
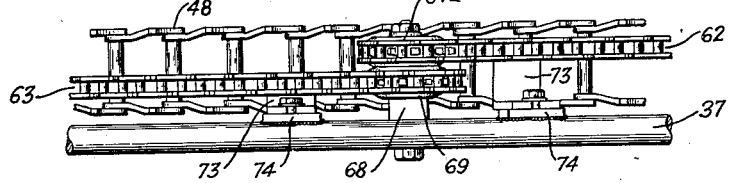
Fig. 4
Fig. 5
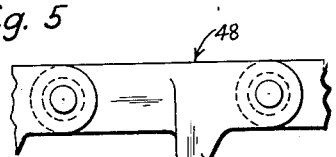
Fig. 6
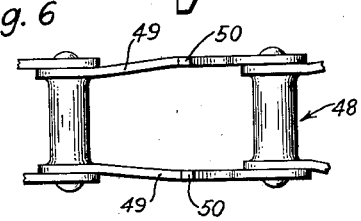
Fig. 7
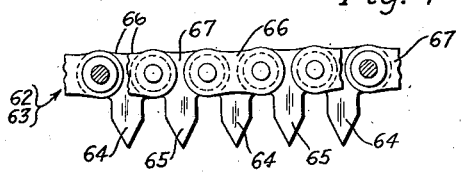
Fig. 8
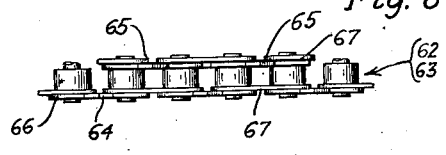
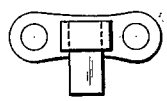
Fig. 9
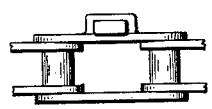
Fig. 10
INVENTOR.
Allan R. Wurtele
BY
F. Bascom Smith
ATTORNEY Patented Feb. 3, 1948

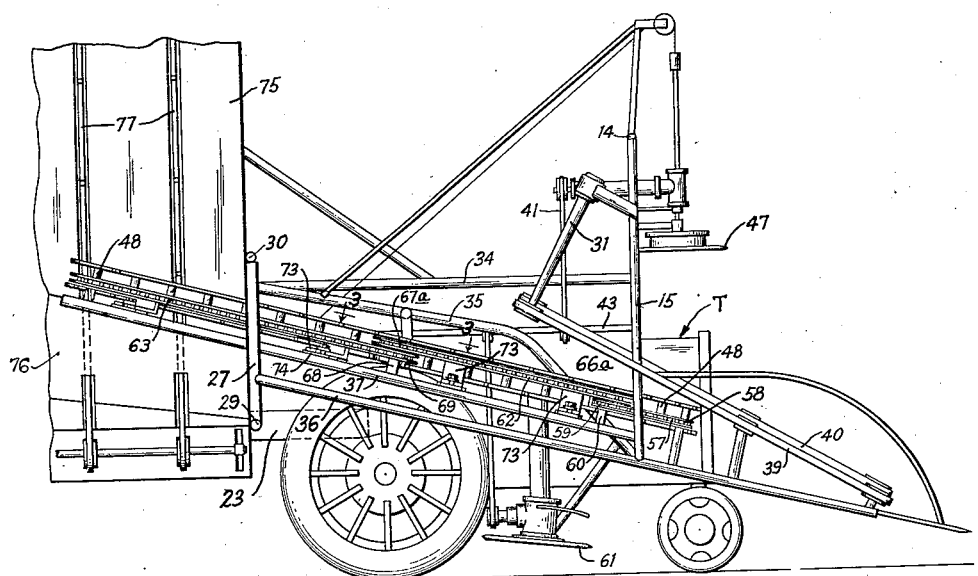

2,435,334

UNITED STATES PATENT OFFICE 2,435,334

CONVEYING MECHANISM FOR HARVESTERS

Allan R. Wurtele, Mix, La.

Application September 7, 1944, Serial No. 552,953

8 Claims. (Cl. 198—162)

This invention relates to apparatus for harvesting crops and more particularly to power driven machinery adapted for both harvesting and loading crops which consist of plants having elongated stalks, such as sugar cane and the like.

One of the objects of the present invention is to provide mechanical harvesting means of the above type wherein novel means are employed for conveying and elevating cane stalks, or the like, in a relatively upright position.

Another object of the invention is to provide novel conveyor apparatus for plants having elongated stalks, such as sugar cane and the like, whereby said stalks may be conveyed in a relatively upright position without material longitudinal slippage and without appreciable damage to the stalks.

A further object is to provide conveying and elevating means which are so constructed as to grip elongated stalks of plants in a novel manner whereby the same may be moved laterally and upwardly in a relatively upright position.

A further object is to provide novel conveying means for plant stalks which are simple in construction and operation and yet durable and efficient.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is a side elevation, with parts broken away, showing one form of harvester-loader embodying the present invention, some parts being shown diagrammatically in the interest of clarity;

Fig. 2 is a similar top plan view of the apparatus of Fig. 1, with parts removed in the interest of clarity;

Fig. 3 is a partial top plan view, on an enlarged scale, showing one form of the novel conveyor means comprehended by the present invention, the view being taken on line 3—3 of Fig. 1;

Fig. 4 is a partial side elevation of said conveyor means on the same scale as in Fig. 3;

Figs. 5 and 6 are detail plan and side elevation views, respectively, showing parts of one of the conveyor chains on a still larger scale;

Figs. 7 and 8 are detail plan and side elevation views, respectively, on an enlarged scale illustrating another chain of the conveyor means; and, Figs. 9 and 10 are similar detail views showing a modified form of conveyor chain which may be employed.

In the embodiment of the invention illustrated in the drawings, by way of example, a simply constructed light weight frame of comparatively open construction is removably mounted on the chassis of a standard four-wheel, power-driven tractor in the manner shown and fully described in my copending application Serial No. 432,203, filed February 25, 1942. The open construction of the frame is especially desirable in order to prevent clogging of the harvester by the immense foliage of sugar cane and similar crops. The frame accommodates all of the harvesting and loading mechanisms of the apparatus and is preferably mounted on a tractor with said mechanism arranged to insure god balance for the entire apparatus with respect to the supporting wheels of the tractor, thereby rendering the machine readily maneuverable in the soft earth encountered in cane fields or the like. All of the moving parts of the harvester-loader combination illustrated are preferably driven by the tractor engine which also propels the machine through the field, thereby insuring proper timing of the power driven parts with respect to the movement of the harvester through the field and making it unnecessary to provide more than one power source. In view of the fact that the present invention is concerned primarily with the conveying means for the plants to be harvested, only those parts of the harvester which are closely related to and cooperate in some manner with said conveying means are shown and described herein in detail, reference being had to said copending application for a detail disclosure of the other parts.

The frame structure, which is mounted on the tractor, preferably supports a power driven gathering or pick-up means for erecting those cane stalks or other plants which may be growing at an angle to the vertical and for guiding the stalks into engagement with a cutting mechanism that is adapted to remove the tops or upper end portions of the plants, including the upper leaves or bush portions and such part of the stalks themselves as may have too low a sugar content to warrant processing. As the harvester moves forward, the stalks of one row, which have been wholly or partially stripped of their leaves either by hand or by mechanical means on the harvester, are guided into and gripped by novel conveying means and at about the same time are severed near their roots by a power driven cutter which is also supported by the frame structure.

The stalks thus stripped, topped, and cut near the roots are ready for processing at the sugar mill and are moved by the novel conveying means to an elevated position at the rear of the harvester and released to fall in a horizontal position on an inclined loading platform or elevator carried by the frame structure and extending upwardly and transversely across the rear of the tractor. The fresh cut stalks are moved along the loading platform by elevator chains or belts and dropped over the upper edge of the platform into a cart or other conveyor for immediate transportation to the sugar mill, or other destination.

The frame structure mentioned above is preferably constructed as a rigid unit and removably secured to any suitable tractor, such as a McCormick-Deering Farmall tractor T, in the manner fully set forth in the above-mentioned copending application, only minor changes being made to accommodate the novel conveyor means of the present invention. As shown, the frame comprises a front arch, including two vertical supporting members 10 and 11 which are rigidly secured in any suitable manner on the chassis of the tractor near the forward end thereof. Sloping upwardly to the left, as viewed from the front of the tractor, is a cross beam 14 attached, as by welding, to the upper ends of posts 10 and 11. Rigidly secured to and depending vertically from the overhanging outer end of cross beam 14 are two spaced posts 15 and 16 which form the sides of an arch through which the cane stream passes to the conveyor mechanism that will be hereinafter described. Posts 15 and 16 are suitably braced against lateral movement to thereby increase the rigidity of the frame structure.

The rear portion of the harvester frame, which is suitably mounted on a pair of beams 22, 23 extending rearwardly from the chassis of the tractor, includes a horizontal cross beam 29 from which a number of vertical posts 24, 25, 26, 27 may extend. The upper ends of said posts may be connected by a transverse beam 30 and the same may be additionally braced against lateral movement by suitable braces which are not shown.

The above described front and rear portions of the harvester frame are connected to each other and, hence, braced against fore and aft movement by a beam 34 joining the upper ends of posts 10 and 24, a rigid bar 35 which extends forwardly and downwardly from adjacent the upper end of post 25 to a point adjacent the lower end of depending support 16, two vertically spaced bars 36 and 37 which also extend forwardly and downwardly from the rear framework to depending support 15, and a bar 38 which extends forwardly and downwardly from adjacent the upper end of post 26 to depending support 16.

Supported by the forward portion of the harvester frame at the right side of the tractor, as viewed from the driver's seat 28, are means for gathering and erecting the cane plants and guiding the same into the novel conveyor to be hereinafter described, said means comprising a pair of endless pick-up and gathering chains 39 and 40, which may be of any suitable known structure, supported on forwardly extending arms 44 and 45 of the harvester frame. The gathering chains operate in a rearwardly upwardly inclined plane (Fig. 1) and are preferably driven in any suitable manner from the drive shaft of the tractor. The driving means must not interfere with the passage of the cane stalks or other plants into and through the harvester and in the form shown includes a pair of bevel gear mechanisms in housings 31 and 32, said gear mechanisms being connected with the drive shaft of the tractor through chain drives 41 and 42 and a shaft 43 that is rotatably supported in the harvester frame. Chains 39 and 40 are provided with laterally projecting prongs or lugs 46 for engaging the cane stalks and the same converge to bring the stalks in each row to a relatively vertical position at the mouth of the conveyor to be described hereafter. In addition to the movable pick-up chains which are driven in unison with the movement of the harvester through the field, suitable stationary pick-up arms of known construction may be employed.

Although mechanical means may be provided on the harvester for stripping leaves from the plant stalks before and/or after the same are severed from their roots, it has been found to be practical to strip the main or lower portions of the stalks of their leaves in advance of the harvester by manual means. This may be readily and satisfactorily accomplished by the use of a tool having a plurality of parallel prongs on a long handle, such as a pitch fork, for example.

As the harvester moves forward and the plants which are growing at an angle are lifted to a relatively vertical position by the above-described gathering or pick-up arms, the upper or bush portions thereof are guided to the forward edge of a suitable cutter, such as the rotatable cutter 47 (shown only in Fig. 1). This cutter may be of the same construction and mounted for vertical adjustment in the same manner as the corresponding cutting means illustrated and fully described in the aforementioned co-pending application. Cutter 47 may be driven from chain 41 in a manner also fully described in said copending application. This cutter is preferably vertically adjusted to a suitable position for cutting off the upper leaves or bush portion of each stalk and that portion of the stalk itself which is too low in sugar content to warrant processing thereof.

Either just before or soon after each stalk is topped by cutter 47, a central portion of the stalk is directed by the gathering means into a novel conveyor mechanism. A preferred form of said conveyor mechanism comprises an endless chain 48 having a pitch of approximately two and one-half inches. In the form shown, chain 48 is of the closed-link type and the sides 49, 49 of each link have lugs 50 formed integrally therewith and projecting laterally from the outside edge of the chain. The two lugs on each link of chain 48 may be disposed directly opposite each other as best seen in Figs. 5 and 6. The terms "projecting laterally" and equivalent terms as used herein mean projecting in the same general plane as the sides or side-bars of the chain links and "the outside" edge of the chain is used to indicate the edge of the chain opposite that edge which engages the sprockets.

Conveyor chain 48 is supported and guided in a rearwardly upwardly inclined plane (Fig. 1) by a plurality of idler sprockets which are rotatably mounted on the harvester frame and a drive sprocket 51 (Fig. 2), the latter being drivably connected through a gear mechanism 52 similar to mechanisms 31 and 32 and by a chain drive 53 to an extension of the drive shaft of the tractor T. Sprocket 51 drives the conveyor chain in a clockwise direction as viewed in Fig. 2. Although the above described conveyor chain is shown as passing around or enclosing the driver's seat 28, it will be understood that the same may be led directly from idler sprocket 54 to idler sprocket 55, if desired, and that any one of the illustrated sprockets engaging the chain might be employed as the power driven sprocket for imparting motion to the chain. It will be noted that sprockets 54, 55 and 56 are so arranged that the chain travels rearwardly in a direction parallel to the course of the harvester between sprockets 55 and 56 and then at an angle toward the rear of the harvester between sprockets 56 and 54, as best seen in Fig. 2.

Novel means are provided for cooperating with that portion of chain 48 between sprockets 55, 56 and 54 whereby cane stalks or the like may be gripped and conveyed in a relatively upright position to an elevated point at the rear of the harvester. In the form shown, said means comprises three endless chains, or equivalent devices, connected, so to speak, in series. It will be clear, of course, that one or any number of such chains may be employed in lieu of the three shown. The first chain of the series, i. e., chain 57, which cooperates with chain 48 as the latter comes around sprocket 55, is preferably a plain chain of the bushed roller type, although other similar types of chain may be used. Chain 57 has a pitch which is approximately one-third or one-fourth of the pitch of chain 48, a three-quarters inch pitch having been found satisfactory in one suitable embodiment for harvesting sugar cane. Two sprockets 58 and 59 on a spindle or shaft 60 are provided for supporting chain 57 so that a portion thereof travels parallel and adjacent to chain 48. The distance between the adjacent portions of chains 48 and 57 is preferably somewhat greater than the diameter of the average cane stalk so that the chains will cooperate to align and direct the stalks in substantially single file without gripping the same. Gripping of the stalks by the rearwardly upwardly inclined conveyor at this point might result in pulling the plants out of the ground before the stalks are severed from their roots.

Just before each stalk is engaged and severed from its roots at a point near or below the surface of the ground by a rotary cutter 61, which may be constructed and operated in the manner fully described in the above-mentioned copending application, said stalk moves between chain 48 and the second cooperating or secondary chain 62. The latter, and the third cooperating chain 63 are preferably of the same size and type as chain 57 but are provided at the outside edges thereof with a series of pointed projections or stickers 64, 65. As shown, a projection or tooth 64 extends from each of the outside links 66 at one side of the chain and a projection 65 extends from each of the inside links 67 at the other side of the chain. If desired, all of the teeth or projections 64, 65, one for each link of the chain, may extend from the side-bars of the links located on the same side of the chain or both side-bars of each link may be provided with a tooth or projection, but the illustrated embodiment has been found very satisfactory.

The teeth or projections 64, 65 may be formed as integral parts of the side-bars of the chain links or the same may be applied thereto in any suitable manner, such as by welding. Preferably, these teeth are triangularly shaped and the inclined edges thereof are approximately one inch long and extend between the lugs 50 on opposite sides of chain 48, the latter and chains 62, 63 being so spaced that each cane stalk or other stalk being harvested will either be slightly pierced by one of said teeth and held against chain 48 or the same will be wedged between successive teeth and the outer edge of chain 48. Thus, each stalk will be harmlessly engaged by the cooperating chains in such a manner as to support the same in a relatively vertical position without permitting the stalk to slip longitudinally relative to the chains and without in any way doing material injury thereto. Also, as the cutter 61 moves into engagement with a stalk, the gripping or holding action of the conveyor 48, 62 will prevent said stalk from being bent over and perhaps mutilated by the sawtooth cutter instead of being cleanly cut at a desirable point.

Toothed chain 62 is shown as being supported on two sprockets 66a and 67a, one of which is mounted on the same shaft or spindle 60 as sprocket 59 for chain 57. If desired, sprockets 59 and 66a may be formed as an integral unit or otherwise connected to each other for simultaneous rotation on spindle 60. Sprocket 67a is mounted on the same shaft or spindle 68 as a sprocket 69 which, together with a sprocket 70, supports the second toothed chain 63. The spindles 60 and 68 and the spindle for sprocket 70 may be suitably mounted on supports extending inwardly toward the tractor from frame members 37.

In the form shown, chains 57, 62 and 63 are carried along by the power driven chain 48 by virtue of the connection afforded by the cane stalks interposed therebetween. If desired, however, any one or all of these chains may be power driven. The sprockets 59 and 66a, for example, or the sprocket 58, might be readily connected with the outer pick-up chain 39. The structure illustrated is preferred because of its simplicity.

It will be noted that the respective widths of chain 48 and secondary chains 57, 62, 63 are such that overlapping portions of two of the smaller chains, such as chains 57 and 62 or 62 and 63, may be mounted on superposed sprockets in the manner shown and yet operate between the planes of the inner faces of lugs 50 on opposite sides of chain 48, as best seen in Fig. 4. In this way, any number of secondary conveyor chains may be provided for cooperation with chain 48 by mounting alternate chains to cooperate with the upper and lower portions of the main chain 48. The primary purpose for providing a plurality of the toothed secondary chains is to permit conveyance of the cane stalks in different directions and, hence, deliver said stalks to the most advantageous position.

Suitable means are provided to prevent undue bulging, sagging or climbing of the conveyor chains between successive supporting sprockets therefor. This means may take the form of additional idler sprockets such as sprockets 71, mounted on frame member 38 for engagement with chain 48 at suitable intervals. The operable portions of the smaller and more flexible secondary chains 62 and 63 are preferably backed by rigid elongated rods 72, 73 carried by angle brackets 73. The latter are shown as being adjustably mounted on plates 74 which are in turn welded or otherwise suitably secured to the upper surface of frame member 37. The adjustability of brackets 73 and, hence, rods 72 is effected by means of slots in said brackets which receive threaded bolts carried by the supporting plates 74 on frame member 37. Rods 72 may thus be adjusted toward or away from the inner edges of the operative portions of chains 62 and 63.

Similar means may be provided for backing up chain 57, if desired.

When the stalks of the plants which are being harvested are released by the above described conveyor means at a point between sprockets 54 and 70, said stalks are caused to fall upon a transversely inclined platform 75 in a horizontal position extending in the direction of movement of the harvester. The stalks are guided onto the lower edge of the platform by a suitable curved shield 76 suspended from frame member 37 in a manner fully described in the aforesaid co-pending application. The stalks are then moved to the upper edge of platform 75 by means of conveyor chains or belts 77 and dropped into a wheel-borne conveyor (not shown) or immediate delivery to a mill or market place.

There is thus provided a novel harvester for sugar cane and like crops whereby the latter may be expeditiously and economically harvested with a minimum of waste and a small number of harvest hands. Large crops may thus be quickly removed from the fields when ready for harvesting, thereby avoiding damage by early frosts or unfavorable weather conditions. Such crops may be harvested with the apparatus of the present invention and moved immediately to the mill or market place without manual handling and without appreciable loss of the cane juices or other valuable liquid content. The harvester provided also embodies novel conveyor means which is adapted for rapidly and harmlessly conveying the plant stalks while holding the same in a freely suspended vertical position to permit leaves and other foliage to be stripped or disengaged therefrom.

Although only a single embodiment of the invention is illustrated in the accompanying drawings and described in the fore-going specification, it is to be expressly understood that the same is not limited thereto. For example, various types of chains other than those illustrated might be employed in constructing the conveyor and said chains, or some of them, may be replaced by belts or other equivalent devices. Various changes in the design and arrangement of parts other than those heretofore specifically mentioned may also be made without departing from the spirit and scope of the invention, as will now be apparent to those skilled in the art. For a definition of the limits of the invention, reference is had primarily to the appended claims.

What is claimed is:

1. In a harvester for plants having stalks, conveyor means for said stalks comprising a power-driven endless chain, each link of said chain having a laterally projecting lug extending outwardly therefrom, a second endless chain, means for mounting said chains with portions thereof operable parallel and adjacent to each other in the same plane, and a plurality of relatively pointed elements projecting outwardly from said second chain and extending between the lugs of each pair of adjacent links, said elements having their pointed ends spaced from said first-named chain, whereby said elements cooperate with said first-named chain to hold stalks interposed therebetween against longitudinal movement.

2. In a harvester for plants having stalks, means for conveying said stalks in a relatively upright position comprising a power-driven endless chain, a laterally projecting lug extending outwardly from each side of each link of said chain, the forward edges of said lugs being in substantially the same plane and perpendicular to the direction of movement of the chain, an endless roller chain of smaller pitch than said power-driven chain, means for mounting said chains so that portions thereof operate parallel and adjacent to each other, and relatively pointed teeth projecting outwardly from the links of said roller chain for operation between the lugs on opposite sides of said power-driven chain, whereby said teeth and power-driven chain cooperate to grip said stalks to hold the same against longitudinal movement relative to said chains while the same are moved laterally.

3. In a harvester for sugar cane, or the like, a sprocket-supported endless primary chain, means for driving said chain, a plurality of endless secondary chains of lesser width than said primary chain, sprockets for supporting said secondary chains with portions of the latter extending parallel and adjacent to successive portions of said primary chain, one supporting sprocket for each of said secondary chains being co-axial with one supporting sprocket for another of said secondary chains, and overlapping oppositely extending lateral projections on the outside edges of said primary chain and at least one of said secondary chains.

4. In a harvester for plants having stalks, a sprocket-supported power-driven endless primary chain, a plurality of sprocket-supported endless secondary chains adapted to cooperate with said primary chain for conveying said stalks in a relatively vertical position, spaced laterally projecting lugs extending outwardly from each side of said primary chain, and laterally projecting teeth extending outwardly from at least one of said secondary chains, said teeth extending between the lugs on opposite sides of an adjacent portion of said primary chain, said teeth being spaced at lesser intervals than said lugs whereby said teeth and primary chain cooperate to hold said stalks against appreciable longitudinal movement relative to said chains.

5. In a harvester for plants having stalks, a first endless movable means having spaced laterally-extending rigid lugs thereon, means for imparting longitudinal movement to said means, a second endless movable means having a portion thereof extending parallel and adjacent to a portion of said first means between the planes of the sides of said first means, and a plurality of relatively pointed teeth projecting laterally from said second endless means into overlapping relation with said lugs, said teeth being spaced at lesser intervals than said lugs, whereby a plurality of said teeth extend between each pair of adjacent lugs.

6. In a harvester for plants having stalks, means for gripping said stalks intermediate the ends thereof and conveying the same in a relatively upright position comprising endless power-driven primary means, endless secondary means, means for mounting said primary and said secondary means so that portions thereof will operate parallel and adjacent to each other, a plurality of laterally projecting teeth extending outwardly from said secondary means, and a plurality of laterally projecting lugs extending outwardly from both sides of said primary means for straddling said teeth, said lugs being spaced at greater intervals than said teeth and the ends of said teeth on that portion of said secondary means which is in cooperative relation with said primary means being spaced from the latter a distance less than the diameter of the stalks to be conveyed.

7. Apparatus for conveying cane stalks or the like in a relatively upright position comprising a power-driven endless chain, rigid lugs extending outwardly from and in the plane of the side bars of the links of said chain, a secondary endless chain of smaller pitch than said power driven chain, and relatively pointed teeth extending from and in the plane of the side bars of said secondary chain between the lugs on opposite sides of said first-named chain, the spacing of adjacent portions of said chains being such that said teeth are adapted to engage said stalks to hold the same in contact with said first-named chain and against longitudinal movement relative thereto.

8. In apparatus of the class described, two movably mounted endless means, superposed rotatable means for supporting overlapping portions of said two means, a third endless means having portions operable parallel and adjacent to portions of said two first-named means, lugs on said third endless means adapted to straddle the adjacent portions of said two first-named means, and means projecting from at least one of said two first-named means for operatively engaging plant stalks interposed between the parallel adjacent portions of said endless means for holding said stalks in engagement with said third endless means and against appreciable longitudinal movement relative thereto.

ALLAN R. WURTELE.

REFERENCES CITED

The following references are of record in the file of this patent:

UNITED STATES PATENTS

| Number | Name | Date |
| --- | --- | --- |
| 572,110 | Gray | Dec. 1, 1896 |
| 788,270 | Luce | Apr. 25, 1905 |
| 1,092,216 | Hollis | Apr. 7, 1914 |
| 1,190,598 | Seierup | July 11, 1916 |
| 1,429,991 | Wilkes et al. | Sept. 26, 1922 |
| 1,540,483 | Lang | June 2, 1925 |